US012728566B2

(12) United States Patent
Sajima

(10) Patent No.: US 12,728,566 B2
(45) Date of Patent: Sep. 8, 2026

(54) MOLD FOR GOLF BALLS

(71) Applicant: Sumitomo Rubber Industries, Ltd., Kobe (JP)

(72) Inventor: Takahiro Sajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 142 days.

(21) Appl. No.: 18/436,049

(22) Filed: Feb. 8, 2024

(65) Prior Publication Data

US 2024/0269901 A1 Aug. 15, 2024

(30) Foreign Application Priority Data

Feb. 15, 2023 (JP) ................................ 2023-021406

(51) Int. Cl.

| | |
|---|---|
| ***B29C 33/42*** | (2006.01) |
| ***B29C 43/20*** | (2006.01) |
| ***B29C 44/58*** | (2006.01) |
| ***B29K 621/00*** | (2006.01) |
| ***B29K 675/00*** | (2006.01) |
| ***B29L 31/54*** | (2006.01) |

(52) U.S. Cl.

CPC .......... *B29C 33/424* (2013.01); *B29C 43/203* (2013.01); *B29C 44/58* (2013.01); *B29C 2793/009* (2013.01); *B29K 2621/00* (2013.01); *B29K 2675/00* (2013.01); *B29L 2031/546* (2013.01)

(58) Field of Classification Search

CPC ............ B29C 2793/009; B29C 33/005; B29C 33/424; B29C 43/203; B29C 44/58; B29K 2621/00; B29K 2675/00; B29L 2031/546; A63B 37/0003; A63B 37/00065; A63B 37/0006; A63B 37/0004

See application file for complete search history.

(56) References Cited

U.S. PATENT DOCUMENTS

2003/0158002 A1* 8/2003 Morgan ............ A63B 37/0012 473/383
2004/0198536 A1* 10/2004 Ohama ............. A63B 37/0074 473/378

(Continued)

FOREIGN PATENT DOCUMENTS

JP H10290847 A * 11/1998
JP 2004305434 A 11/2004
JP 2010-284531 A 12/2010

*Primary Examiner* — Xiao S Zhao
*Assistant Examiner* — Victoria Bartlett
(74) *Attorney, Agent, or Firm* — XSENSUS LLP

(57) ABSTRACT

A mold for a golf ball can include a pair of mold halves. Each mold half can have a cavity face including a plurality of pimples. The cavity face can have a low-latitude zone and a high-latitude zone. The low-latitude zone can include a low-latitude base surface having an inner diameter larger than that of a phantom sphere of a cavity. The high-latitude zone can include a high-latitude base surface having an inner diameter equal to that of the phantom sphere. Each pimple can protrude from the low-latitude base surface or the high-latitude base surface. A pimple that intersects an equator plane of the phantom sphere or is proximal to the equator plane can protrude partially or entirely from the low-latitude base surface.

7 Claims, 18 Drawing Sheets

(56) References Cited

U.S. PATENT DOCUMENTS

| | | | | |
|---|---|---|---|---|
| 2004/0248668 | A1* | 12/2004 | Aoyama | A63B 37/0074 473/378 |
| 2010/0317464 | A1* | 12/2010 | Nakagawa | A63B 43/008 473/378 |
| 2012/0157238 | A1* | 6/2012 | Stefan | A63B 37/00065 473/378 |
| 2019/0202095 | A1* | 7/2019 | Sakamine | C08K 5/56 |
| 2020/0269093 | A1* | 8/2020 | Takubo | B29C 45/263 |

* cited by examiner

MOLD FOR GOLF BALLS

CROSS-REFERENCE TO RELATED APPLICATION(S)

The present application claims priority to Japanese patent application JP 2023-021406, filed on Feb. 15, 2023, the entire contents of which is incorporated herein by reference in its entirety.

BACKGROUND

Technical Field

The present specification discloses a mold suitable for molding golf balls.

Background Art

A mold for golf balls may include upper and lower mold halves. The cavity face of the mold has a base surface and a number of pimples. The position of the base surface coincides with the surface of a phantom sphere of a cavity formed when the upper mold half is mated with the lower mold half.

A material is placed into this mold, and a golf ball intermediate product is formed. The intermediate product has a seam. The position of the seam corresponds to a parting line between the upper mold half and the lower mold half. The intermediate product further has a plurality of dimples. Each dimple has a shape that is the inverted shape of each pimple. A part of the material enters the parting face between the upper mold half and the lower mold half to form a burr. The burr adheres to the intermediate product. The position of the burr coincides with the position of the seam. The burr is removed by cutting. From the viewpoint of ease of removal, no dimples are provided on the seam. In other words, pimples are placed avoiding the parting line. An example of such a mold for golf balls is disclosed in Japanese Laid-Open Patent Publication No. 2010-284531.

When cutting a burr, dimples around the burr can also be cut. This cutting can deform the dimples. This deformation results in an appearance defect of a golf ball. This deformation can impair the flight symmetry of the golf ball. In particular, deformation is a concern in a golf ball having dimples that intersect the equator of a phantom sphere.

SUMMARY

A mold for golf balls can include a pair of mold halves configured to be mated with each other thereby forming a cavity having a spherical shape. Each of the mold halves has a cavity face including a plurality of pimples. The cavity face has a low-latitude zone and a high-latitude zone. The low-latitude zone includes a low-latitude base surface having an inner diameter larger than an inner diameter of a phantom sphere of the cavity. The high-latitude zone includes a high-latitude base surface having an inner diameter equal to the inner diameter of the phantom sphere. Each of the pimples protrudes from the low-latitude base surface or the high-latitude base surface. A pimple, of the plurality of pimples, that intersects an equator plane of the phantom sphere or is proximal to the equator plane protrudes partially or entirely from the low-latitude base surface.

DETAILED DESCRIPTION

Hereinafter, preferred embodiments will be described in detail with appropriate reference to the drawings.

It is an intention of the applicant to provide a mold with which a golf ball having excellent appearance and flight symmetry can be obtained.

With molds according to one or more embodiments of the present disclosure, a golf ball including dimples having intended specifications can be obtained. The mold can contribute to the appearance and the flight symmetry of the golf ball.

Figure 1:
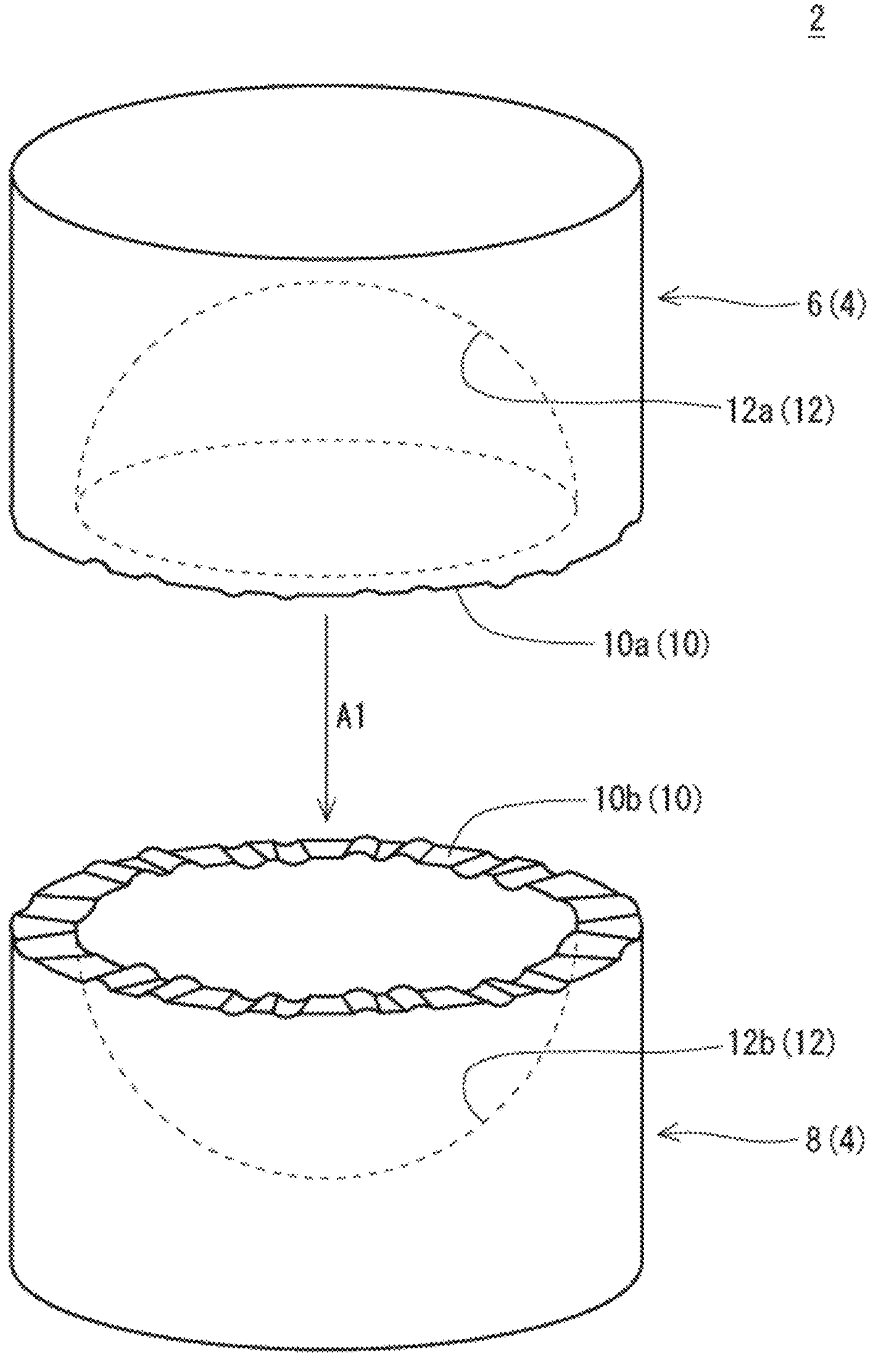
FIG. 1 is an exploded perspective view showing a mold for golf balls according to one or more embodiments of the present disclosure.

A mold 2 for golf balls shown in FIG. 1, according to one or more embodiments of the present disclosure, can include a pair of mold halves 4. Specifically, the mold 2 can include an upper mold half 6 and a lower mold half 8. Each mold half 4 can have a parting face 10 and a cavity face 12.

As indicated by an arrow Al in FIG. 1, the upper mold half 6 can descend relative to the lower mold half 8. When the upper mold half 6 is mated with the lower mold half 8, the mold 2 can be regarded as being closed. In this state, a parting face 10*a* of the upper mold half 6 can be in contact with a parting face 10*b* of the lower mold half 8.

Figure 2:
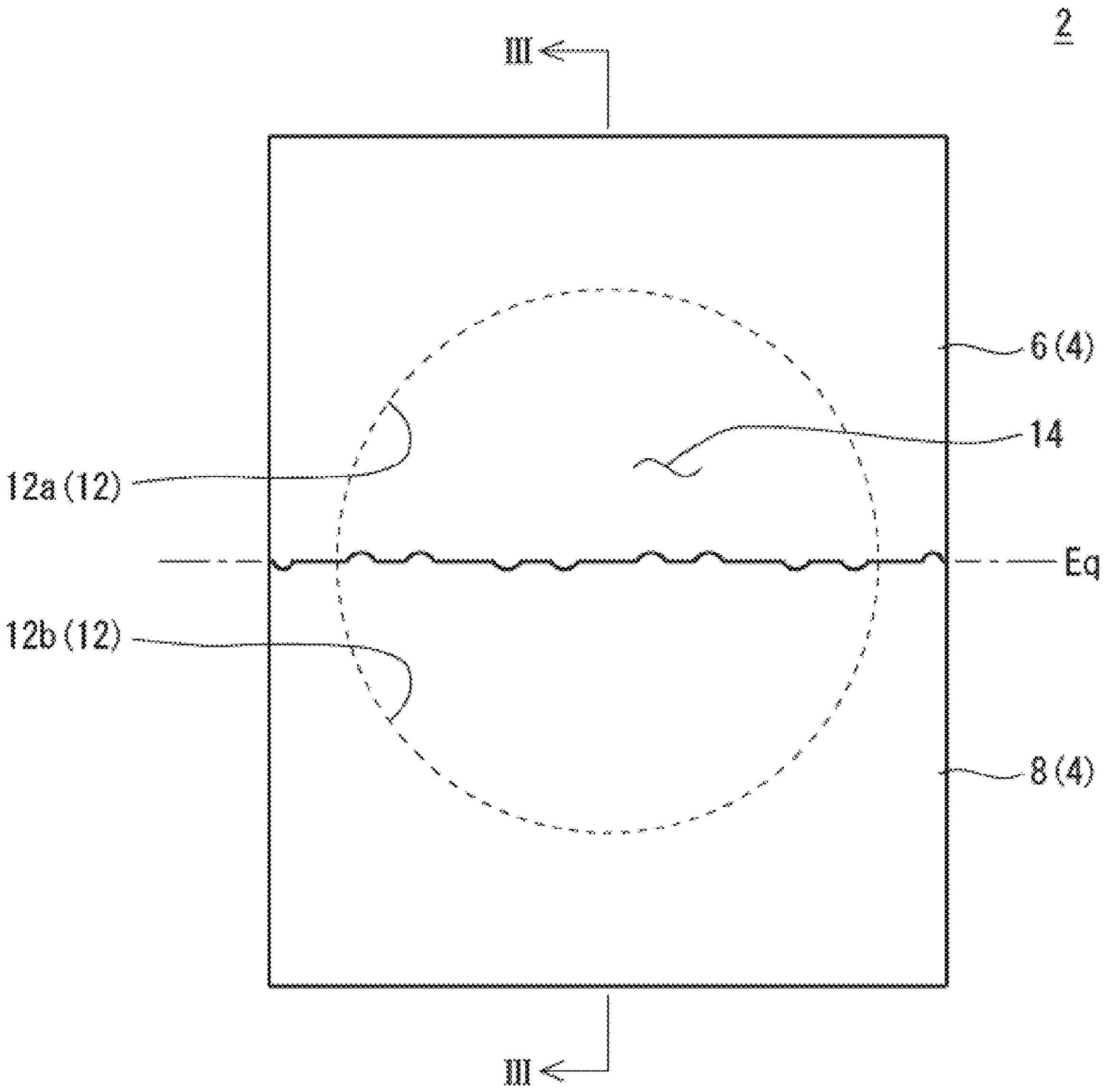
FIG. 2 is a front view showing the mold in FIG. 1.
Figure 3:
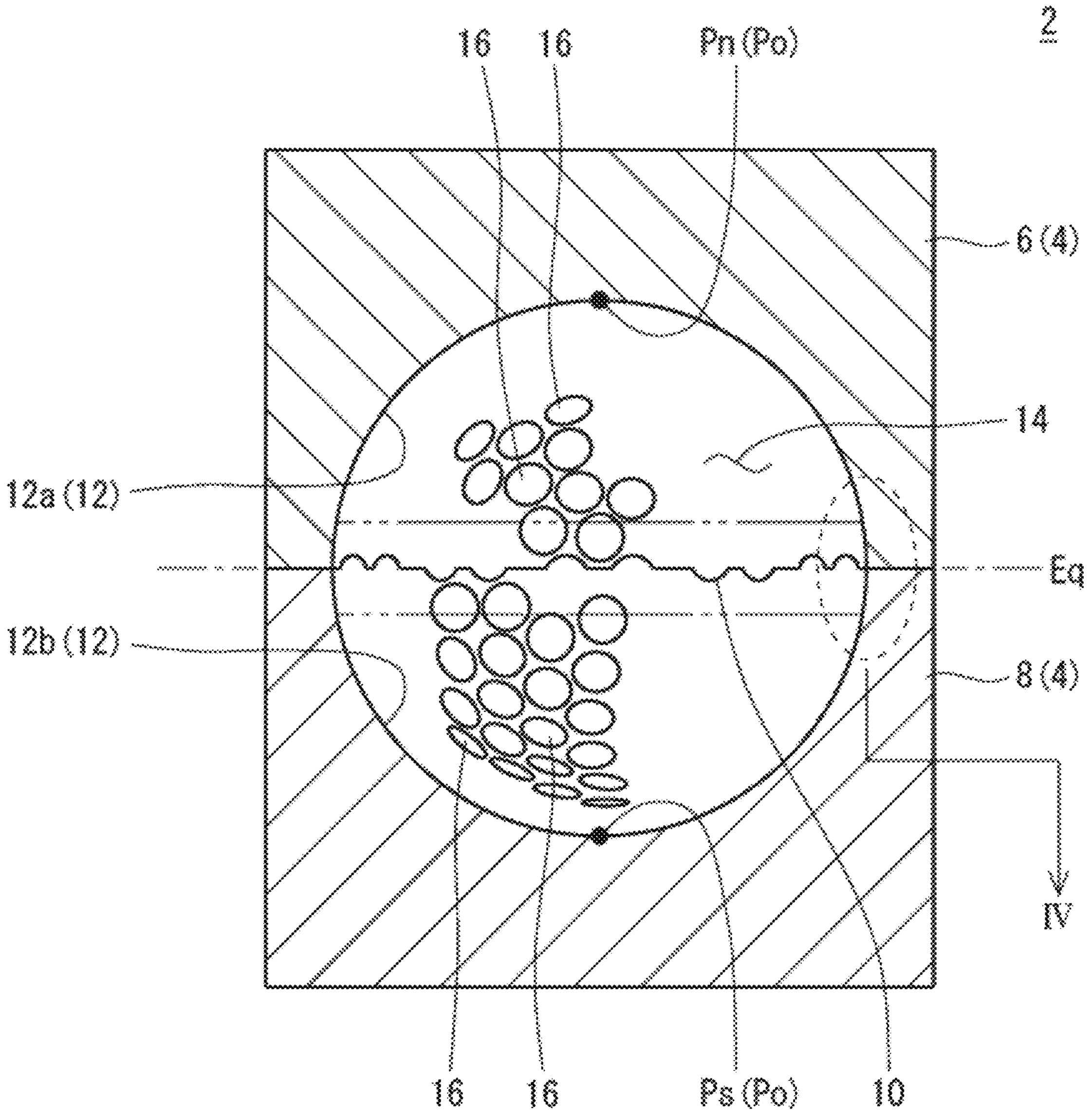
FIG. 3 is a cross-sectional view taken along a line III-III in FIG. 2.

FIGS. 2 and 3 show the closed mold 2 according to one or more embodiments of the present disclosure. In the mold 2, a cavity 14 can be formed when the upper mold half 6 is mated with the lower mold half 8. The cavity 14 can have a substantially spherical shape. In FIGS. 2 and 3, reference character Eq indicates an equator or equator plane. The equator can have a circular shape. The equator plane can be regarded as a plane that includes the equator. The equator Eq can be defined on the assumption that an uppermost portion of the cavity face 12 of the upper mold half 6 is a north pole Pn (see FIG. 3) of a globe and a lowermost portion of the cavity face 12 of the lower mold half 8 is a south pole Ps of the globe. The latitudes of the north pole Pn and the south pole Ps can be 90°. The latitude of the equator Eq can be 0°.

As shown in FIG. 3, each cavity face 12 can have a relatively large number of pimples 16. The number of pimples 16 in the entire mold 2 generally can be 250 to 550. In the present embodiment, the contour of each pimple 16 can be a circle. FIG. 3 shows only some pimples 16. In reality, a relatively large number of pimples 16 can be placed over the entire cavity face 12. The parting face 10 of each mold half 4 can have an uneven shape.

Figure 4:
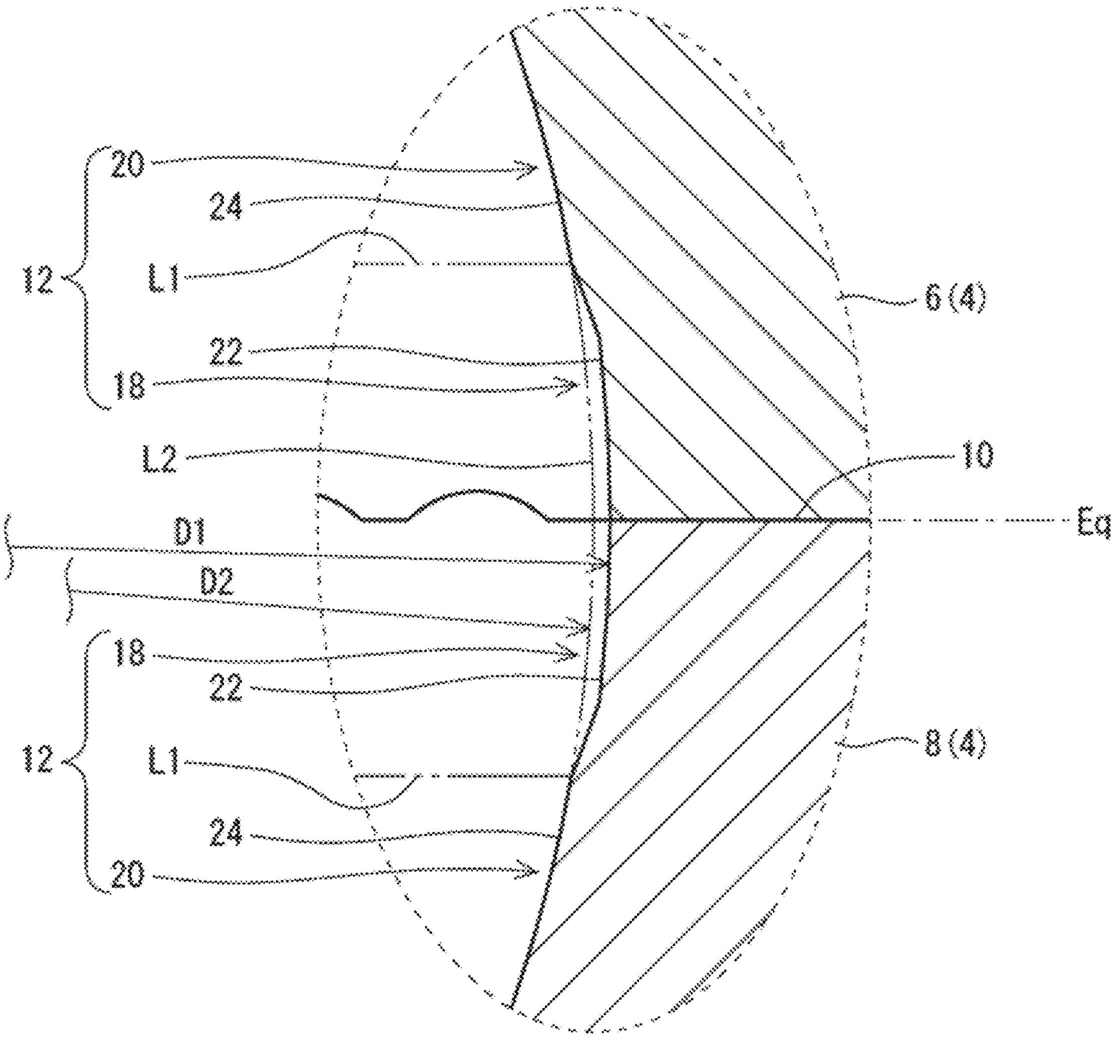
FIG. 4 is an enlarged view of a part indicated by reference character IV in FIG. 3.

FIG. 4 is an enlarged view of a part indicated by reference character IV in FIG. 3. FIG. 4 shows each cavity face 12 when it is assumed that the pimples 16 are not present. Each cavity face 12 can have a low-latitude zone 18 and a high-latitude zone 20. In FIG. 4, each virtual line indicated by reference character L1 can be regarded as a boundary line between the low-latitude zone 18 and the high-latitude zone 20. The boundary line L1 can be parallel to the equator Eq.

The low-latitude zone 18 can extend from the parting face 10 to the boundary line L1. The low-latitude zone 18 can extend along the equator Eq. The low-latitude zone 18 can have a ring shape. The low-latitude zone 18 can include a low-latitude base surface 22. The low-latitude base surface 22 can be a surface of the low-latitude zone 18 other than the pimples 16. In FIG. 4, a curve indicated by reference character L2 can represent a phantom sphere of the cavity 14. The phantom sphere L2 can coincide with each cavity face 12 when it is assumed to have no pimple 16 and no low-latitude zone 18. An inner diameter D1 of the low-latitude base surface 22 can be larger than an inner diameter D2 of the phantom sphere L2.

The high-latitude zone 20 can extend from the boundary line L1 to a pole Po (see FIG. 3). The high-latitude zone 20 can have a bowl shape. The high-latitude zone 20 can include a high-latitude base surface 24. The high-latitude base surface 24 can be a surface of the high-latitude zone 20 other than the pimples 16. The inner diameter of the high-latitude base surface 24 can be equal to the inner diameter D2 of the phantom sphere L2.

Since the inner diameter D1 of the low-latitude base surface 22 can be larger than the inner diameter D2 of the phantom sphere L2 and the inner diameter of the high-latitude base surface 24 can be equal to the inner diameter D2 of the phantom sphere L2, the shape of the cavity 14 may be regarded as not strictly spherical. In the present specification, such a state can be referred to as "substantially spherical shape."

As described above, each cavity face 12 can have a relatively large number of pimples 16. Each pimple 16 can be regarded as belonging to the low-latitude zone 18. The pimple 16 can also be regarded as belonging to the high-latitude zone 20. The mold 2, according to one or more embodiments of the present disclosure, can have (1) pimples 16 belonging entirely to the low-latitude zone 18,
(2) pimples 16 belonging entirely to the high-latitude zone 20, and
(3) pimples 16 belonging partially to the low-latitude zone 18 and belonging partially to the high-latitude zone 20.

In other words, the mold 2 can have (1) pimples 16 protruding entirely from the low-latitude base surface 22,
(2) pimples 16 protruding entirely from the high-latitude base surface 24, and
(3) pimples 16 protruding partially from the low-latitude base surface 22 and protruding partially from the high-latitude base surface 24.

Figure 5:
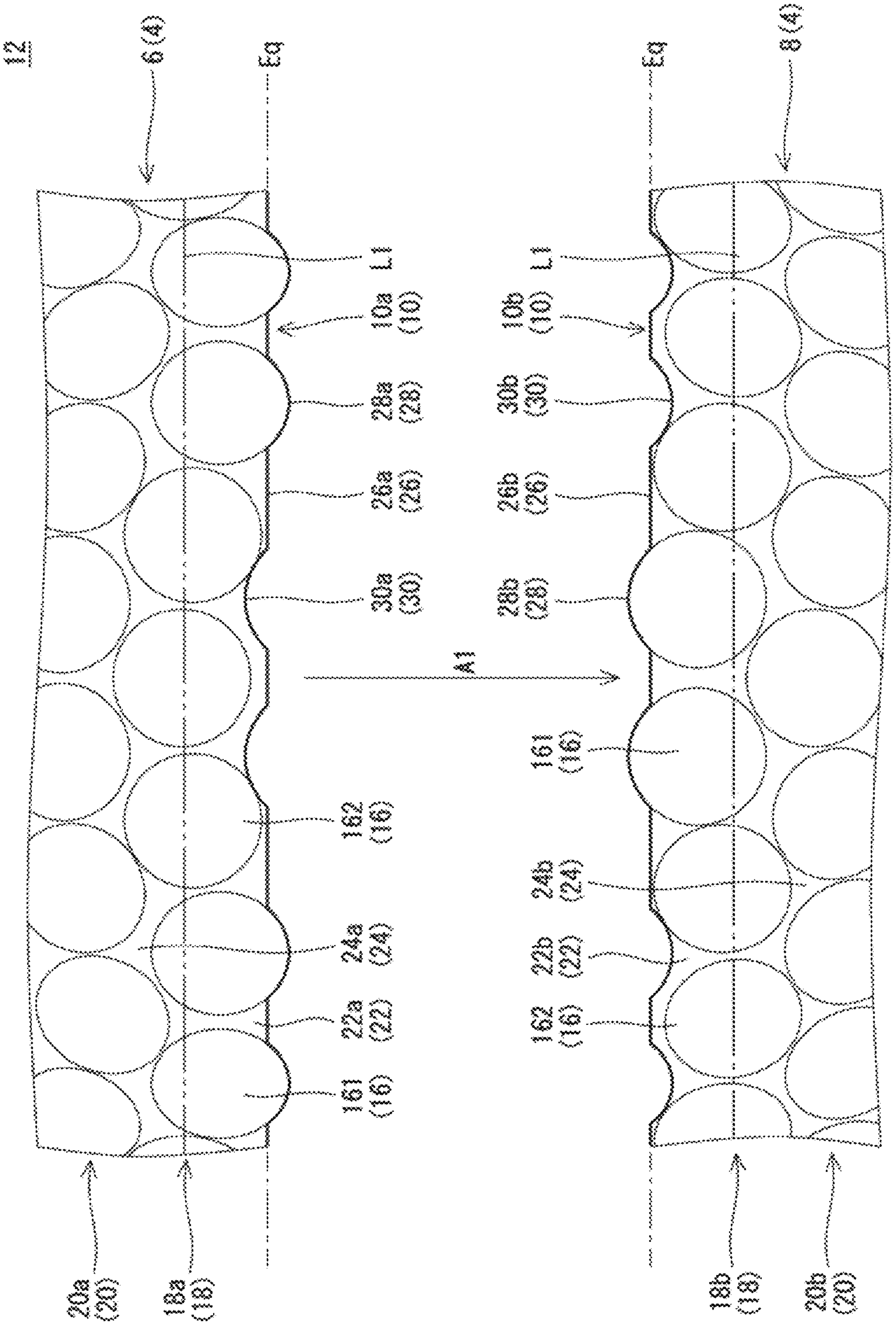
FIG. 5 is an exploded enlarged view showing a part of each cavity face of the mold in FIG. 3.

FIG. 5 shows, in an enlarged manner, a part of each cavity face 12 in a state where the mold 2 is opened. FIG. 5 shows a low-latitude base surface 22*a* of the upper mold half 6, a high-latitude base surface 24*a* of the upper mold half 6, a low-latitude base surface 22*b* of the lower mold half 8, and a high-latitude base surface 24*b* of the lower mold half 8. FIG. 5 further shows pimples 16.

As shown in FIG. 5, the parting face 10 of each mold half 4 can include a flat surface 26, ridges 28, and recesses 30. The flat surface 26 can extend along the equator plane Eq. Each ridge 28 can protrude from the equator plane Eq. Each recess 30 can be recessed from the equator plane Eq. Each ridge 28 can include a part of a pimple 16. The outer edge of each ridge 28 can be in the form of an arc. The outer edge can substantially coincide with the contour of the pimple 16. Since each ridge 28 can protrude from the equator plane Eq, the pimple 16 included in the ridge 28 can intersect the equator plane Eq. In the present embodiment, each ridge 28 can be or have a curved surface. Alternatively, some or all of the ridges 28 may be flat. In the present embodiment, each recess 30 can be or have a curved surface. Alternatively, some or all of the recesses 30 may be flat. The parting face 10 may have the shape of a combination of multiple curved surfaces.

Figure 6:
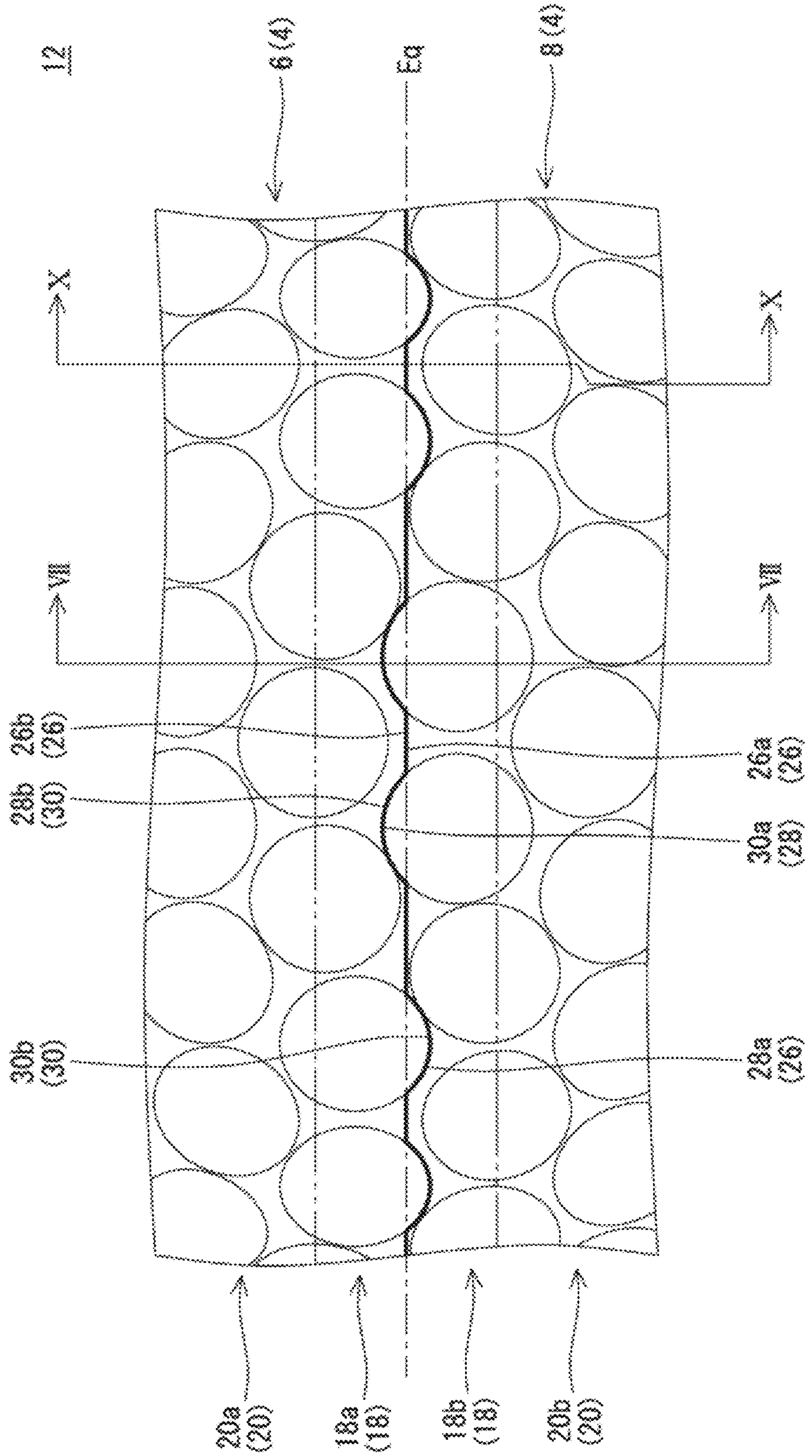
FIG. 6 is an enlarged view showing a part of each cavity face of the mold in FIG. 3.

FIG. 6 shows each cavity face 12 in a state where the mold 2 is closed. In FIG. 6, ridges 28*a* of the upper mold half 6 can be fitted to recesses 30*b* of the lower mold half 8, and ridges 28*b* of the lower mold half 8 can be fitted to recesses 30*a* of the upper mold half 6. A flat surface 26*a* of the upper mold half 6 can be in contact with a flat surface 26*b* of the lower mold half 8.

As can be understood from FIGS. 5 and 6, the pimples 16 in each first row from the equator plane Eq can belong partially to the low-latitude zone 18 and belong partially to the high-latitude zone 20. In other words, the pimples 16 in each first row from the equator plane Eq protrude partially from the low-latitude base surface 22 and protrude partially from the high-latitude base surface 24.

The pimples 16 in each second row from the equator plane Eq can belong entirely to the high-latitude zone 20. In other words, the pimples 16 in each second row from the equator plane Eq can protrude entirely from the high-latitude base surface 24.

In the present embodiment, there may be no pimples 16 that belong entirely to the low-latitude zone 18. In other words, there may be no pimples 16 that protrude entirely from the low-latitude base surface 22. Alternatively, the mold 2 may have pimples 16 that belong entirely to the low-latitude zone 18.

In FIG. 5, reference character 161 can indicate an intersecting pimple. The intersecting pimple 161 can intersect the equator plane Eq. In FIG. 5, reference character 162 indicates a proximal pimple. The proximal pimple 162 can be regarded as proximal to the equator plane Eq. The proximal pimple 162 can satisfy the following conditions (1) to (3).

(1) A perpendicular line drawn from the center of the contour of the pimple 162 to the equator plane Eq does not intersect any other pimple 16.
(2) The latitude of the center of the contour of the pimple 162 is not greater than 10°.

(3) The pimple 162 is not an intersecting pimple 161.

Figure 7:
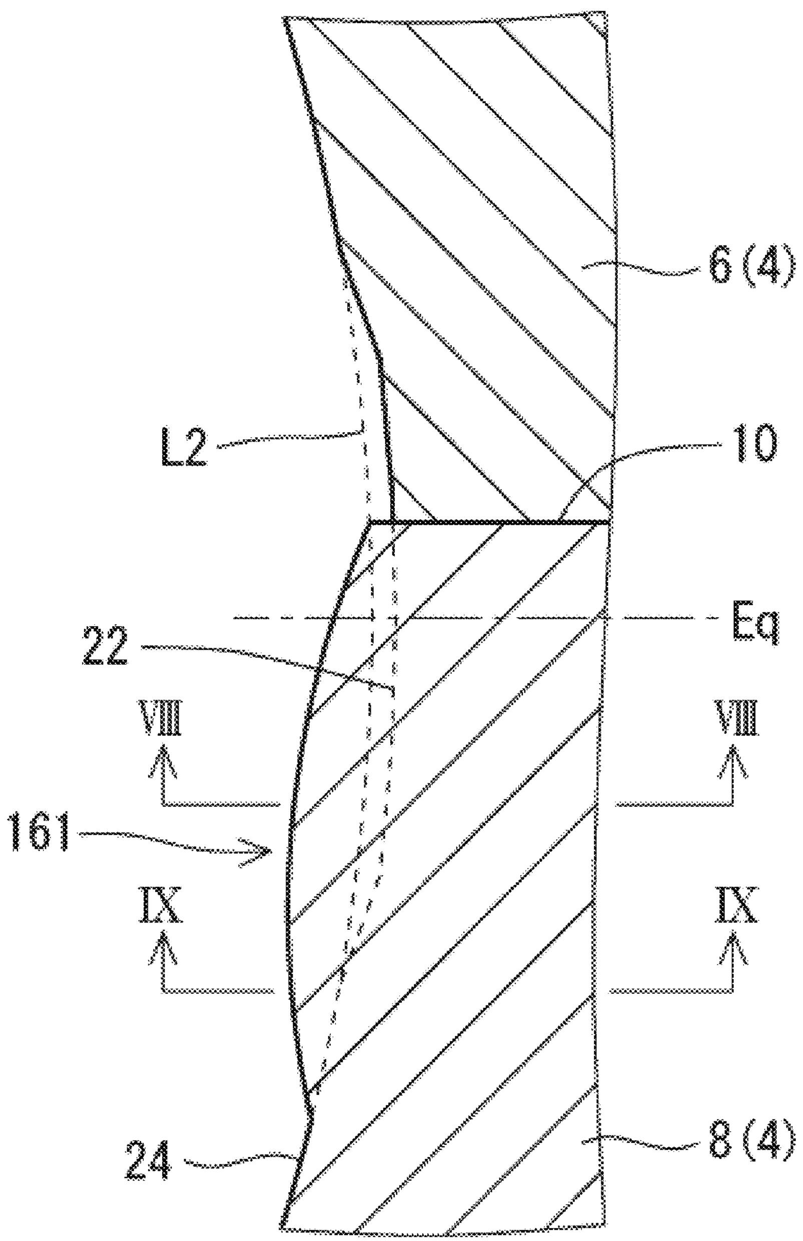
FIG. 7 is an enlarged cross-sectional view taken along a line VII-VII in FIG. 6.
Figure 8:
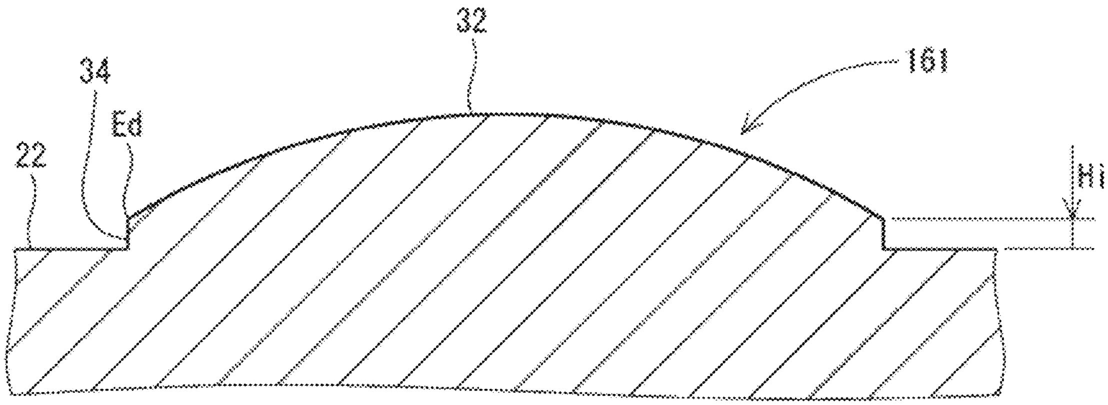
FIG. 8 is an enlarged cross-sectional view taken along a line VIII-VIII in FIG. 7.

FIG. 7 is an enlarged cross-sectional view taken along a line VII-VII in FIG. 6. FIG. 8 is an enlarged cross-sectional view taken along a line VIII-VIII in FIG. 7. These drawings show the intersecting pimple 161 according to one or more embodiments of the present disclosure. As shown in FIG. 8, the intersecting pimple 161 can have a convex surface 32 and a side surface 34. The convex surface 32 can be convex inwardly in the radial direction of the phantom sphere L2. The side surface 34 can exist between the convex surface 32 and the low-latitude base surface 22. The side surface 34 can extend in the height direction of the convex surface 32 (up-down direction in FIG. 8). The side surface 34 can extend from an edge Ed of the convex surface 32 to the low-latitude base surface 22. In FIG. 8, the intersecting pimple 161 can protrude from the low-latitude base surface 22.

Figure 9:
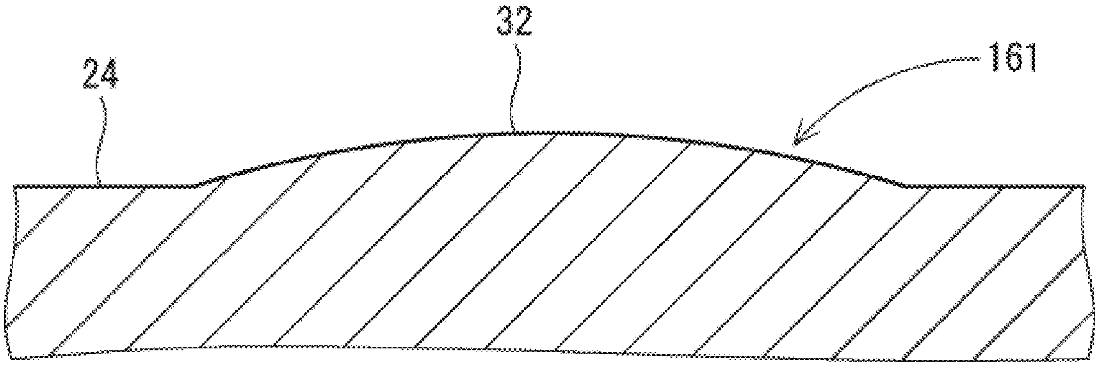
FIG. 9 is an enlarged cross-sectional view taken along a line IX-IX in FIG. 7.

FIG. 9 is an enlarged cross-sectional view taken along a line IX-IX in FIG. 7. FIG. 9 shows the convex surface 32. At the position shown in FIG. 9, the intersecting pimple 161 may not have the side surface 34. In FIG. 9, the intersecting pimple 161 can protrude from the high-latitude base surface 24

In the present embodiment, the intersecting pimple 161 can protrude partially from the low-latitude base surface 22 and can protrude partially from the high-latitude base surface 24. In other words, at least a part of the intersecting pimple 161 can protrude from the low-latitude base surface 22. The intersecting pimple 161 may protrude entirely from the low-latitude base surface 22.

Figure 10:
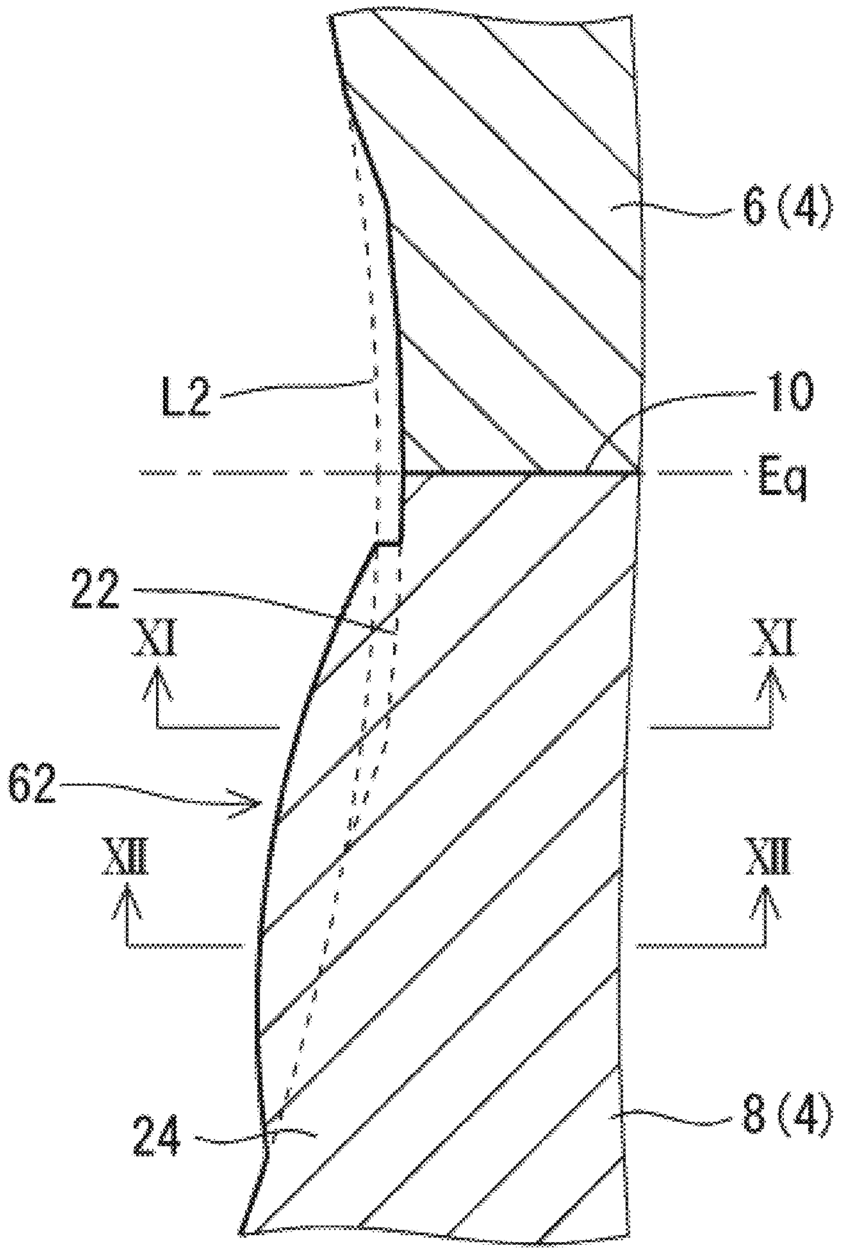
FIG. 10 is an enlarged cross-sectional view taken along a line X-X in FIG. 6.
Figure 11:
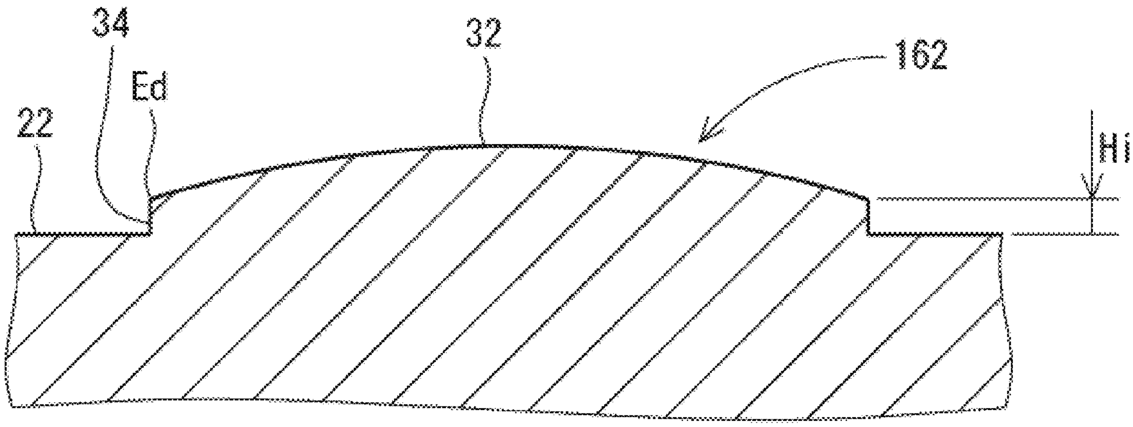
FIG. 11 is an enlarged cross-sectional view taken along a line XI-XI in FIG. 10.

FIG. 10 is an enlarged cross-sectional view taken along a line X-X in FIG. 6. FIG. 11 is an enlarged cross-sectional view taken along a line XI-XI in FIG. 10. These drawings show the proximal pimple 162 according to one or more embodiments of the present disclosure. As shown in FIG. 11, the proximal pimple 162 can have a convex surface 32 and a side surface 34. The convex surface 32 can be convex inwardly in the radial direction of the phantom sphere L2. The convex surface 32 can be separated from the low-latitude base surface 22. The side surface 34 can extend in the height direction of the convex surface 32 (up-down direction in FIG. 11). The side surface 34 can extend from an edge Ed of the convex surface 32 to the low-latitude base surface 22. In FIG. 11, the proximal pimple 162 can protrude from the low-latitude base surface 22.

Figure 12:
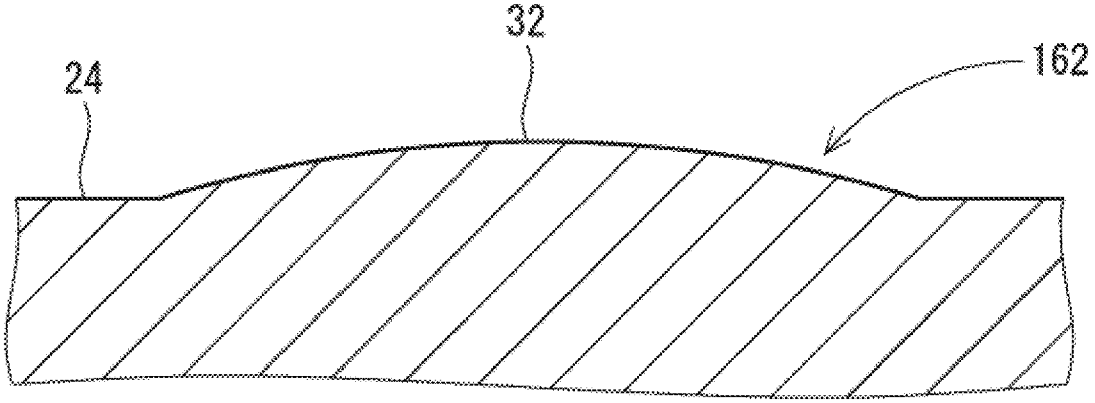
FIG. 12 is an enlarged cross-sectional view taken along a line XII-XII in FIG. 10.

FIG. 12 is an enlarged cross-sectional view taken along a line XII-XII in FIG. 10. FIG. 12 shows the convex surface 32 according to one or more embodiments of the present disclosure. At the position shown in FIG. 12, the proximal pimple 162 may not have the side surface 34. In FIG. 12, the proximal pimple 162 can protrude from the high-latitude base surface 24.

In the present embodiment, the proximal pimple 162 can protrude partially from the low-latitude base surface 22 and can protrude partially from the high-latitude base surface 24. In other words, at least a part of the proximal pimple 162 can protrude from the low-latitude base surface 22. The proximal pimple 162 may protrude entirely from the low-latitude base surface 22.

The mold 2 can be used for molding golf balls. The mold 2 can be used for compression molding, injection molding, cast molding, and the like. In any of these methods, a material can be placed into the mold 2. The material can be pressurized and can be caused to flow in the mold 2 to obtain a golf ball intermediate product 36.

Figure 13:
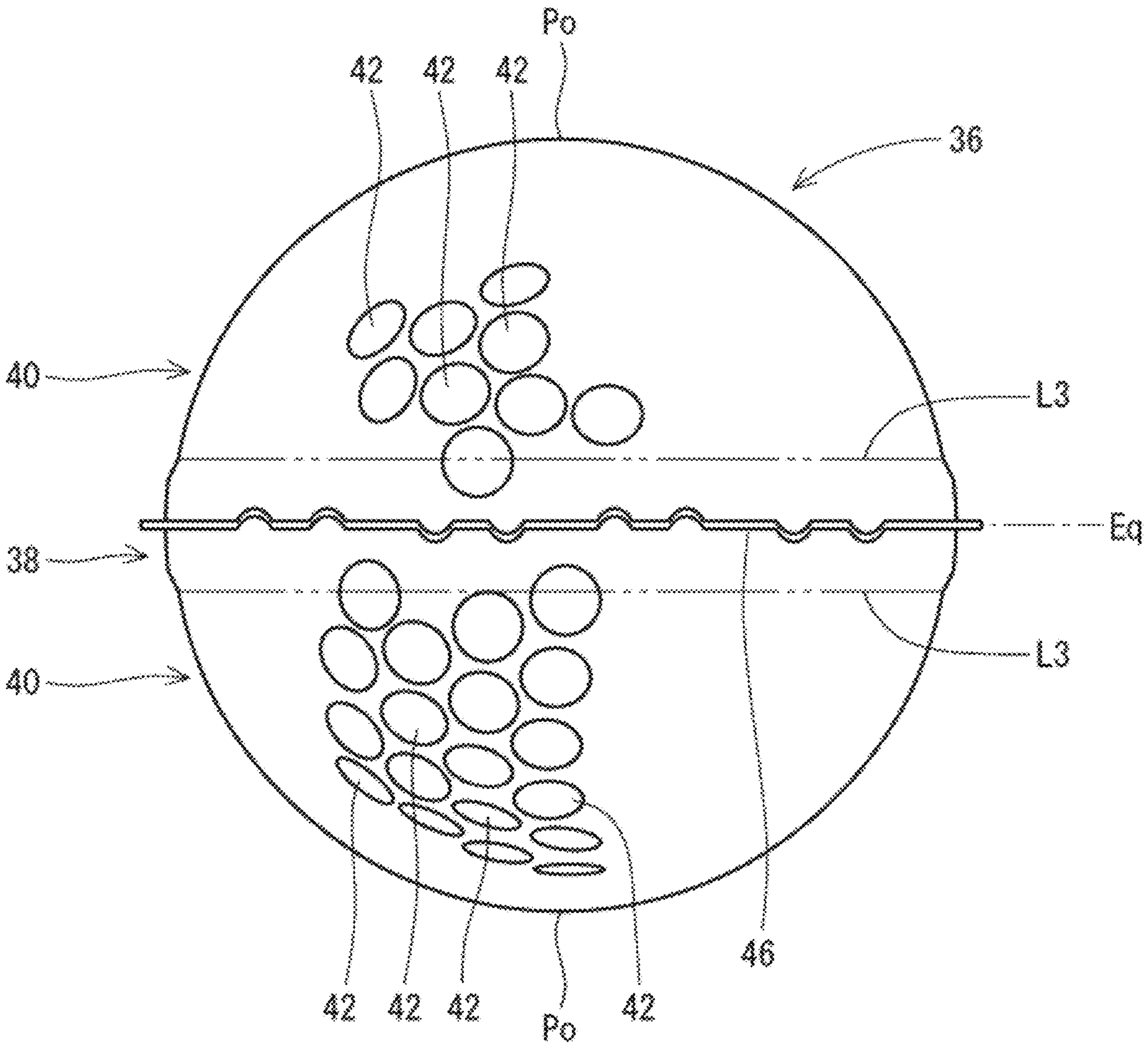
FIG. 13 is a front view showing a golf ball intermediate product obtained with the mold shown in FIG. 1.
Figure 14:
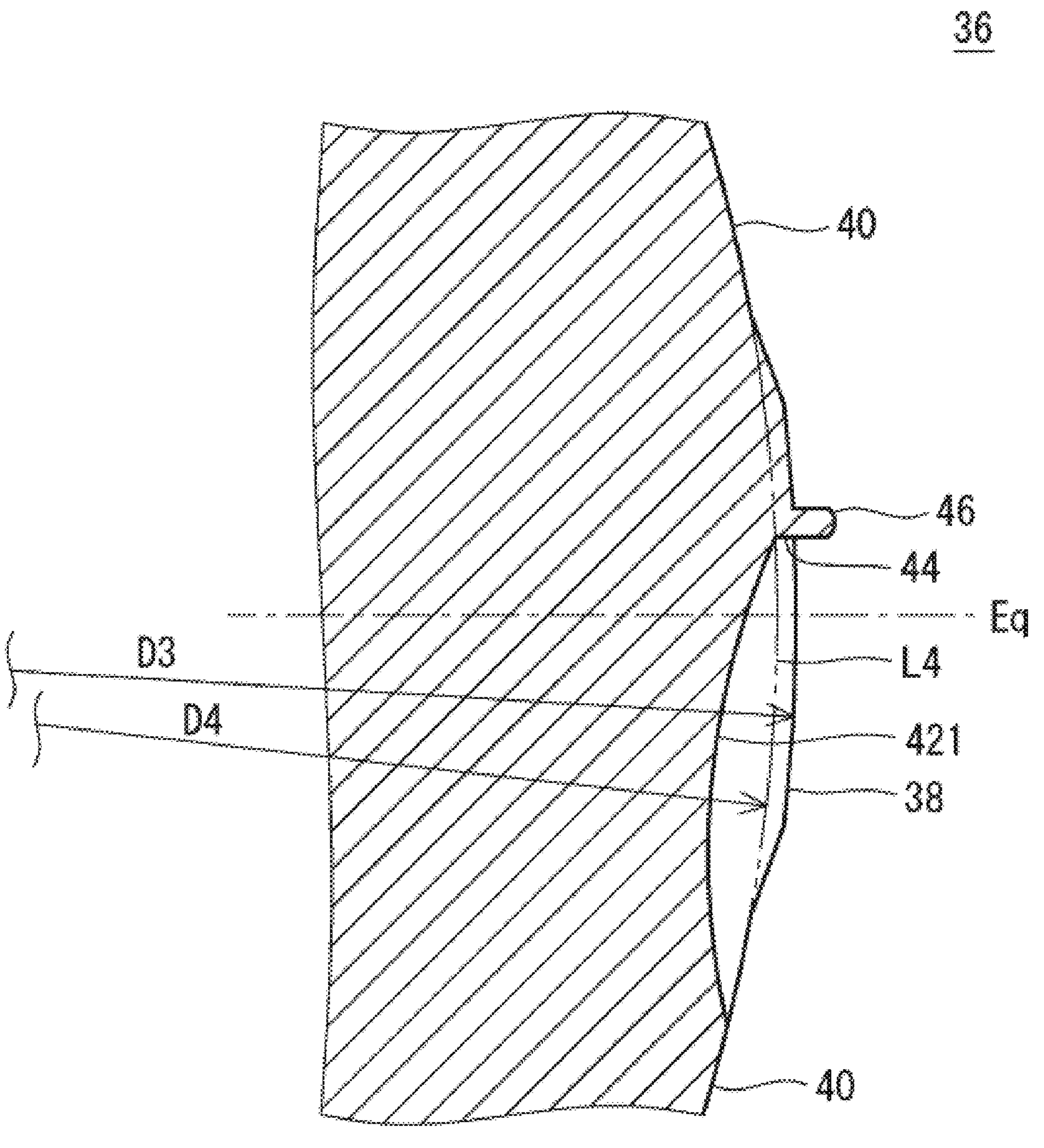
FIG. 14 is an enlarged cross-sectional view showing a part of the golf ball intermediate product in FIG. 13.

FIGS. 13 and 14 show the golf ball intermediate product 36 according to one or more embodiments of the present disclosure. The intermediate product 36 can have a shape that is the inverted shape of the cavity face 12. Specifically, the surface of the intermediate product 36 can have a large-diameter zone 38 and a pair of small-diameter zones 40. In FIG. 13, each virtual line indicated by reference character L3 can be regarded as a boundary line between the large-diameter zone 38 and the small-diameter zone 40. The boundary line L3 can be parallel to an equator Eq of the intermediate product 36. The large-diameter zone 38 can be formed by the low-latitude zone 18 of the mold 2. Each small-diameter zone 40 can be formed by the high-latitude zone 20 of the mold 2. In FIG. 14, a curve indicated by reference character L4 can represent a phantom sphere of a golf ball. The phantom sphere L4 can represent the surface of the golf ball when it is assumed that dimples described later are not present.

As shown in FIG. 13, the large-diameter zone 38 can extend from the equator plane Eq to each boundary line L3. The large-diameter zone 38 can extend along the equator Eq. The large-diameter zone 38 can have a ring shape. As shown in FIG. 14, an outer diameter D3 of the large-diameter zone 38 can be larger than an outer diameter D4 of the phantom sphere L4.

As shown in FIG. 13, each small-diameter zone 40 can extend from the boundary line L3 to a pole Po. The small-diameter zone 40 can have a bowl shape. As shown in FIG. 14, the outer diameter of the small-diameter zone 40 can be equal to the outer diameter D4 of the phantom sphere L4.

The golf ball intermediate product 36 can have a relatively large number of dimples 42 on the surface thereof. The number of dimples 42 can be equal to the number of pimples 16 in the mold 2. Each dimple 42 can have a shape that is the inverted shape of each pimple 16. FIG. 14 shows a dimple 421 formed by the intersecting pimple 161, according to one or more embodiments of the present disclosure. The dimple 421 can be recessed partially from the large-diameter zone 38 and can be recessed partially from the small-diameter zone 40. The dimple 421 can have a step 44. The step 44 can originate from the side surface 34 of the pimple 16.

The golf ball intermediate product 36 can further have a burr 46. The burr 46 may be generated by entry of the material into the gap between the parting face 10*a* of the upper mold half 6 and the parting face 10*b* of the lower mold half 8. The generation of the burr 46 may be inevitable, according to one or more embodiments of the present disclosure. As shown in FIG. 13, the burr 46 can have a ring shape. As shown in FIG. 14, the burr 46 can protrude from the large-diameter zone 38.

The material of the outermost layer of the intermediate product 36 can be a rubber composition or a resin composition. In the case of an intermediate product 36 for a one-piece ball, a typical material can be a rubber composition. In the case of an intermediate product 36 for a golf ball having two or more layers, a typical material can be a resin composition. A resin composition containing an ionomer resin or a polyurethane as a base material may be preferable.

Figure 15:
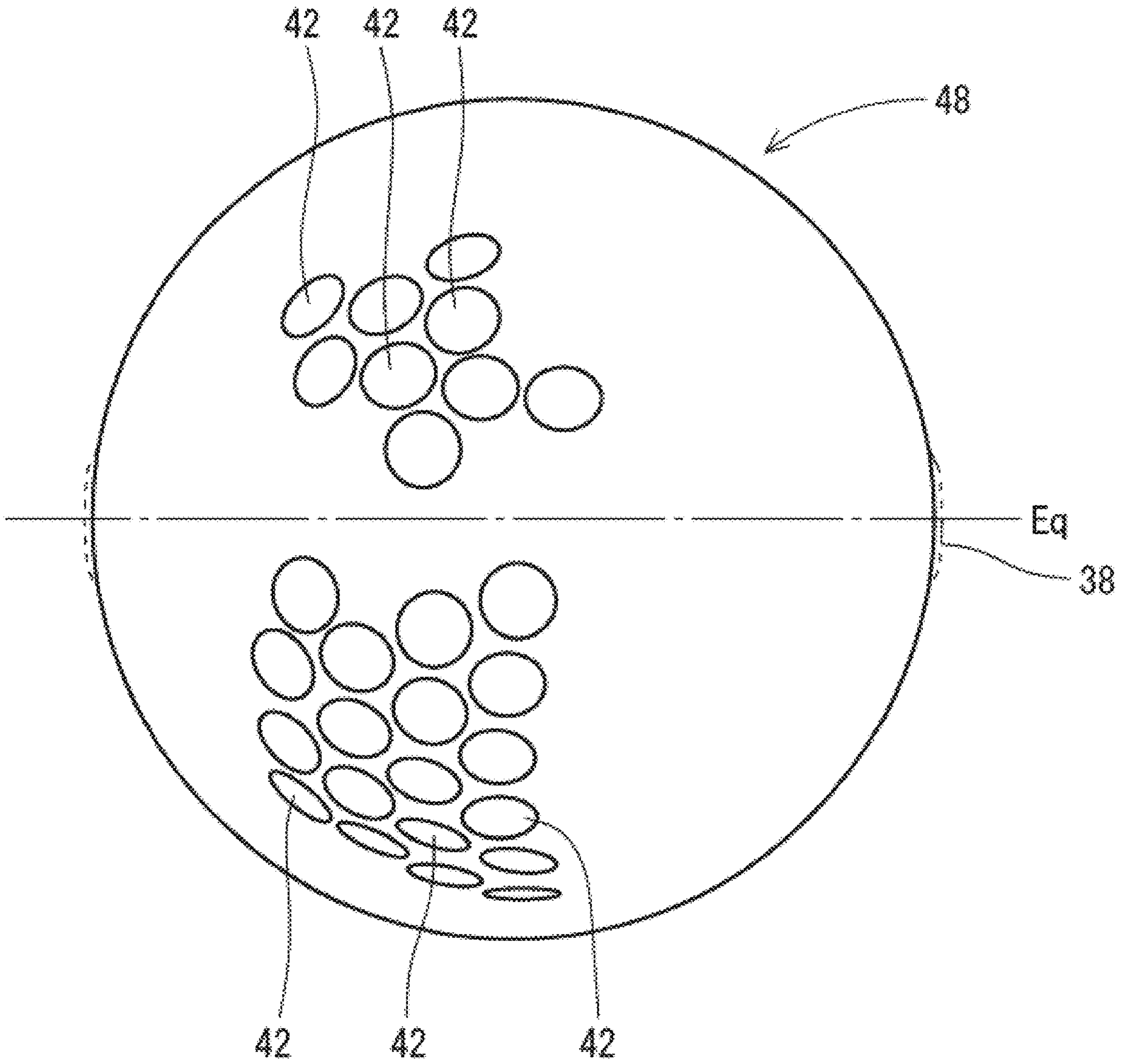
FIG. 15 is a front view showing a golf ball obtained from the intermediate product in FIG. 13.
Figure 16:
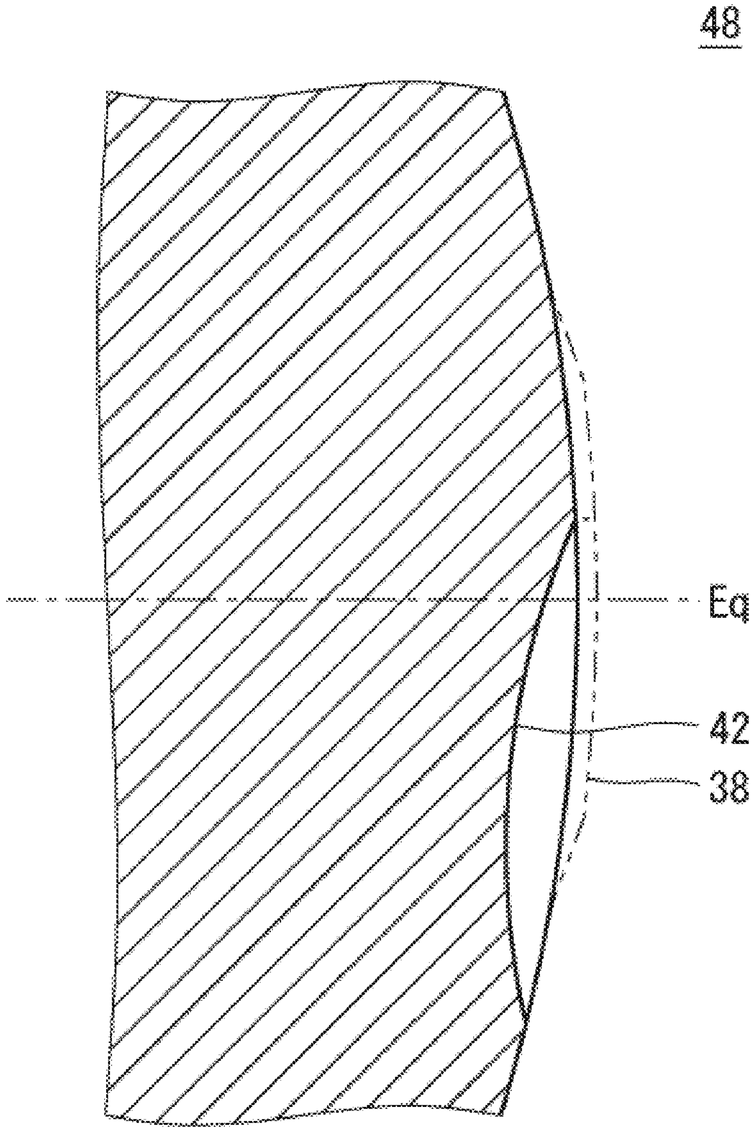
FIG. 16 is an enlarged cross-sectional view showing a part of the golf ball in FIG. 15.
Figure 17:
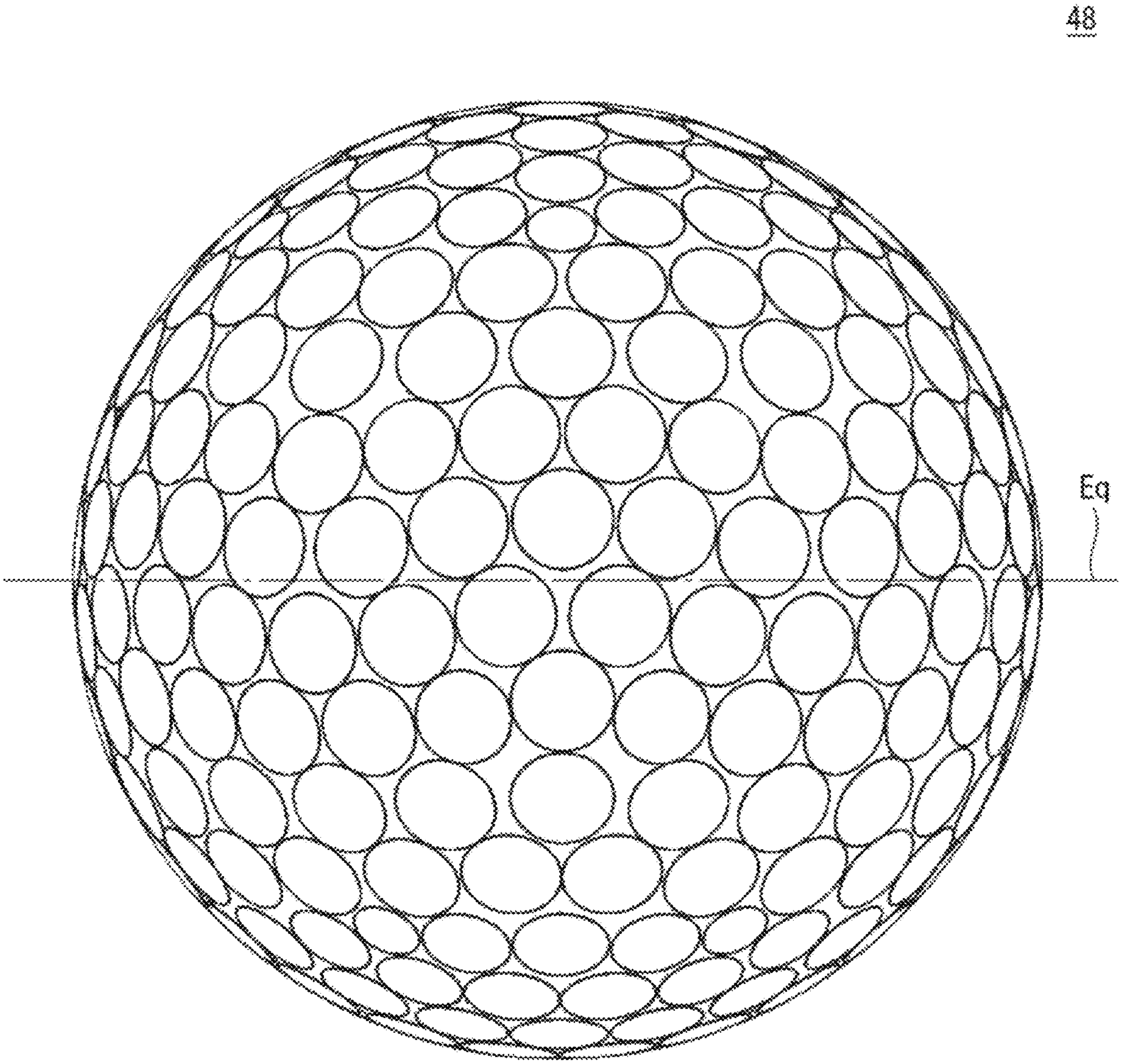
FIG. 17 is a front view showing a dimple pattern of the golf ball in FIG. 15.
Figure 18:
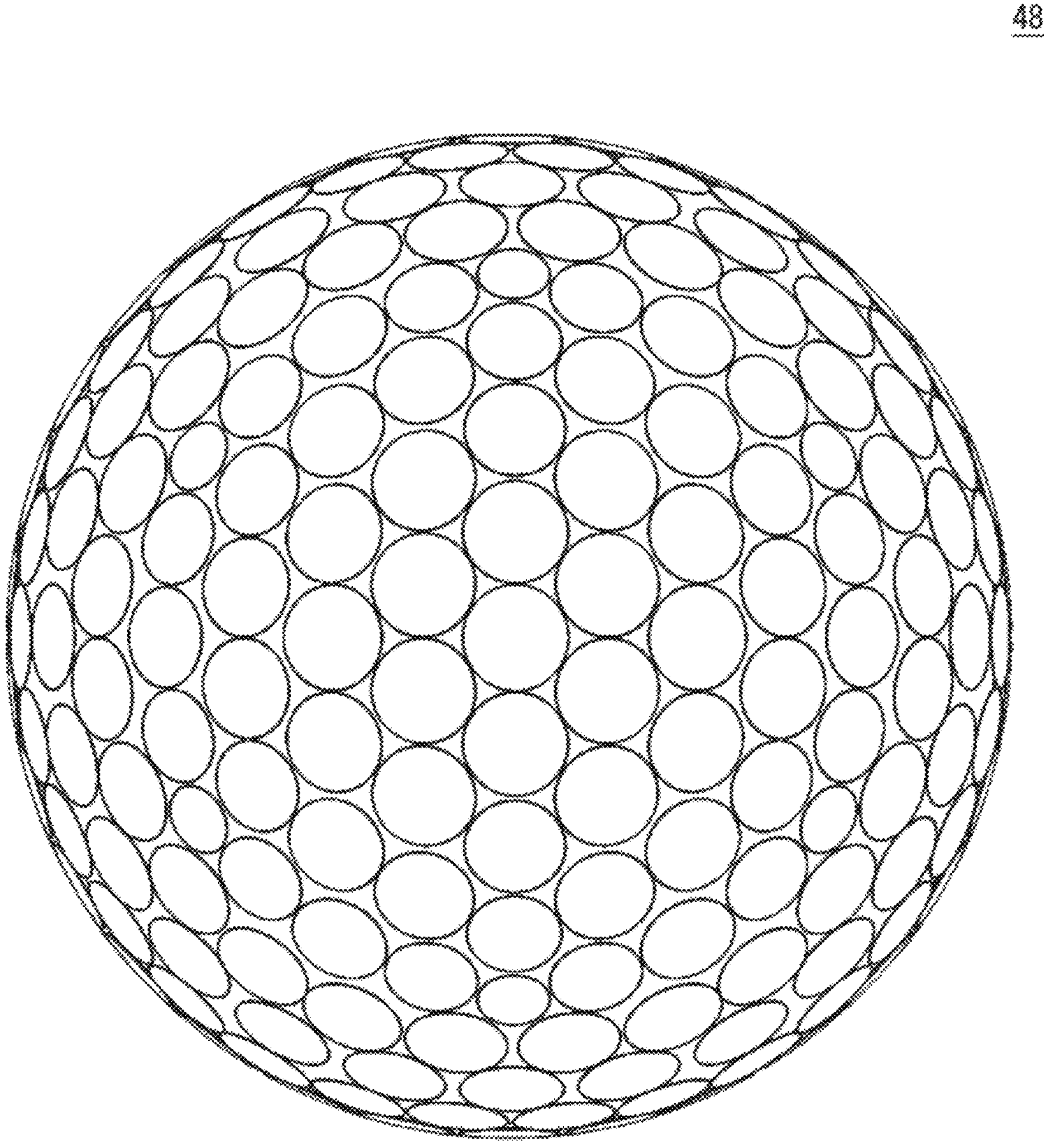
FIG. 18 is a plan view showing the dimple pattern in FIG. 17.

The vicinity of the equator Eq of the golf ball intermediate product 36 can be cut. The cutting can be performed with sandpaper, a grinding stone, a cutter, or the like. The cutting can be performed while the intermediate product 36 is rotated around a line passing through both poles Po, for instance. The cutting may be performed, while the intermediate product 36 is randomly rotated, by a centerless cutting device, a barrel, or the like. The burr 46 can be removed by the cutting. Furthermore, the large-diameter zone 38 can be eliminated by the cutting. The outer diameter of the cut area after the elimination can be substantially equal to the outer diameter D4 of the phantom sphere L4. The step 44 can be eliminated by the cutting. As a result of the cutting, a golf ball 48 can be obtained. FIGS. 15 and 16 show the golf ball 48 according to one or more embodiments of the present disclosure. In FIGS. 15 and 16, the large-diameter zone 38 before cutting is shown by a virtual line. FIGS. 17 and 18 show the dimple pattern of the golf ball 48. The diameter of the golf ball 48 may be not less than 42.67 mm, as an example. This diameter may be preferably not greater than 43.00 mm, more preferably not greater than 42.90 mm, and particularly preferably not greater than 42.80 mm. The golf ball 48 may have a coating layer on the surface thereof.

As described above, when the burr 46 is removed, the large-diameter zone 38 may also be cut together with the burr 46. When the burr 46 is removed, the large-diameter zone 38 can suppress excessive cutting of the dimple 421. Therefore, after cutting, the dimple 421 can have intended specifications (diameter, depth, volume, area, cross-sectional shape, etc.). And the golf ball 48 according to one or more embodiments of the present disclosure can have an excellent appearance. In the golf ball 48, the dimple 421 near the equator Eq can contribute sufficiently to aerodynamic characteristics. As such, the golf ball 48 according to one or more embodiments of the present disclosure can have excellent flight symmetry.

From the viewpoint of suppressing excessive cutting of the dimple 421, the latitude of the boundary line L3 may be preferably not less than 2°, more preferably not less than 3°, and particularly preferably not less than 4°. From the viewpoint of ease of cutting, this latitude may be preferably not greater than 10°, more preferably not greater than 8°, and particularly preferably not greater than 7°. The latitude of the boundary line L3 can be equal to the latitude of the boundary line L1 in the mold 2.

Figure 19:
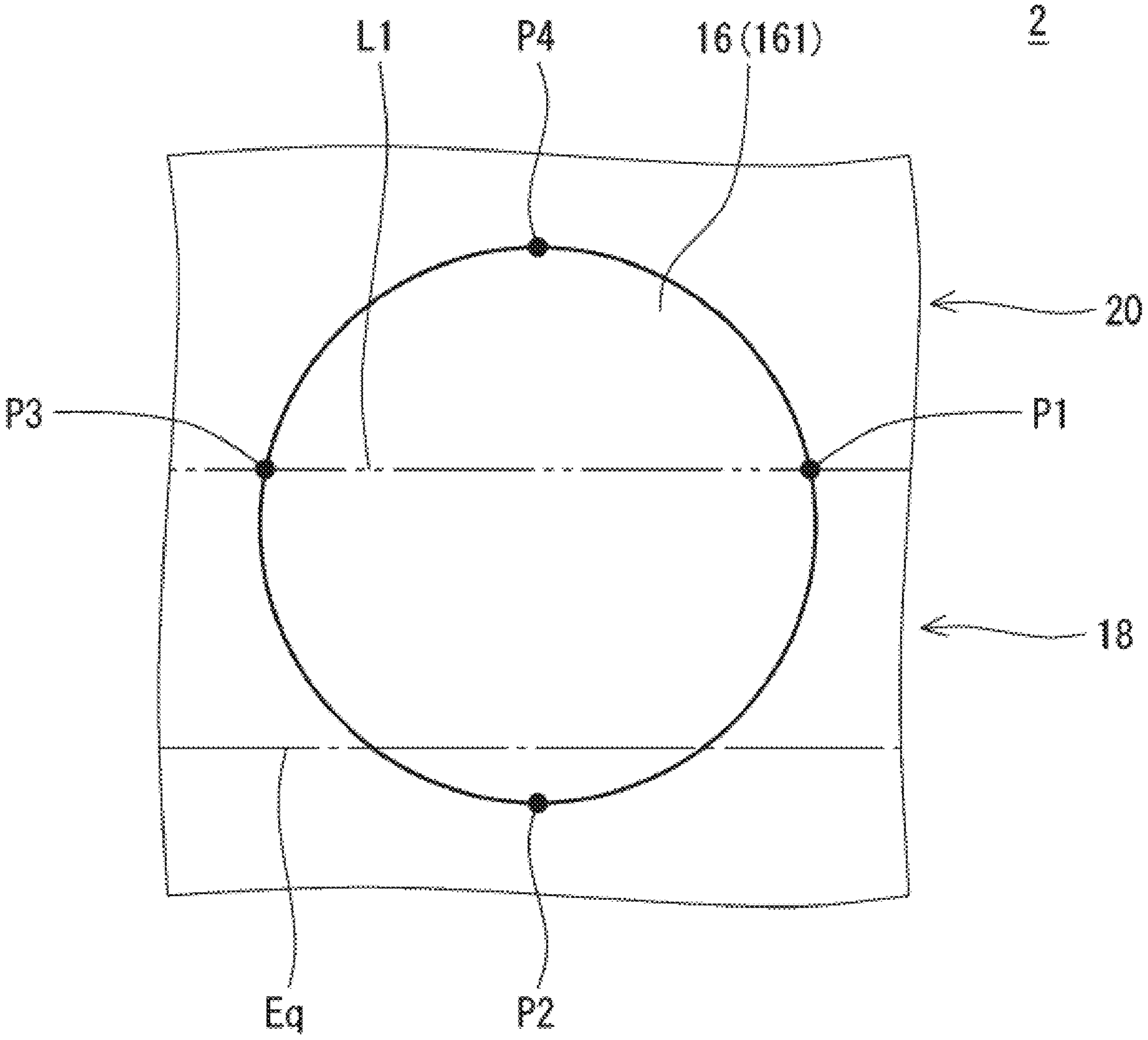
FIG. 19 is an enlarged view showing a part of the mold in FIG. 3.

FIG. 19 is an enlarged view showing a part of the mold 2 in FIG. 3. This drawing shows a pimple 16, the equator Eq, and the boundary line L1, according to one or more embodiments of the present disclosure. The pimple 16 can belong partially to the low-latitude zone 18 and can belong partially to the high-latitude zone 20. In FIG. 19, reference character P1 can indicate a point of intersection of the contour of the pimple 16 and the boundary line L1, reference character P2 can indicate a point that is on the contour of the pimple 16 and in the low-latitude zone 18, reference character P3 can indicate a point of intersection of the contour of the pimple 16 and the boundary line L1, and reference character P4 can indicate a point that is on the contour of the pimple 16 and in the high-latitude zone 20.

The portion of the contour from the point P1 through the point P2 to the point P3 can be in the low-latitude zone 18. The portion of the contour from the point P1 through the point P4 to the point P3 can be in the high-latitude zone 20. In each pimple 16, a ratio Pe of the length of the contour in the low-latitude zone 18 to the total length of the contour can be preferably not less than 25%. With the mold 2 in which the ratio Pe is not less than 25%, a golf ball 48 having excellent appearance and flight symmetry according to one or more embodiments of the present disclosure can be obtained. From this viewpoint, the ratio Pe may be more preferably not less than 35% and particularly preferably not less than 45%. The ratio Pe may be 100%. In the case of a mold 2 in which the contour of each pimple 16 is noncircular, a ratio Pe can be similarly calculated based on the contour. Examples of noncircular pimples include elliptical and polygonal pimples. FIG. 19 shows the intersecting pimple 161, but the ratio Pe in the proximal pimple 162 may also be preferably in the above range.

In FIGS. 8 and 11, an arrow Hi can represent the height of the side surface 34. As can be understood from FIGS. 7 and 10, the height Hi can vary with latitude. A maximum value Hm of the height Hi in the pimple 16 may be preferably not less than 20 μm. In the golf ball intermediate product 36 obtained with the mold 2 in which the maximum value Hm is not less than 20 μm, when the burr 46 is removed, the large-diameter zone 38 can sufficiently suppress excessive cutting of the dimple 421. A golf ball 48 having excellent appearance and flight symmetry according to one or more embodiments of the present disclosure can be obtained from the intermediate product 36. From this viewpoint, the maximum value Hm can be more preferably not less than 30 μm and particularly preferably not less than 40 μm. From the viewpoint of ease of cutting, the maximum value Hm can be preferably not greater than 150 μm, more preferably not greater than 100 μm, and particularly preferably not greater than 80 μm.

From the viewpoint of the appearance and the flight symmetry of the golf ball 48, it may be preferable that, in the intersecting pimple 161, the height Hi of the side surface 34 on the equator plane Eq is the maximum value Hm. At a plurality of locations including the location on the equator plane Eq and other locations, the height Hi may be the maximum value Hm.

Figure 20:
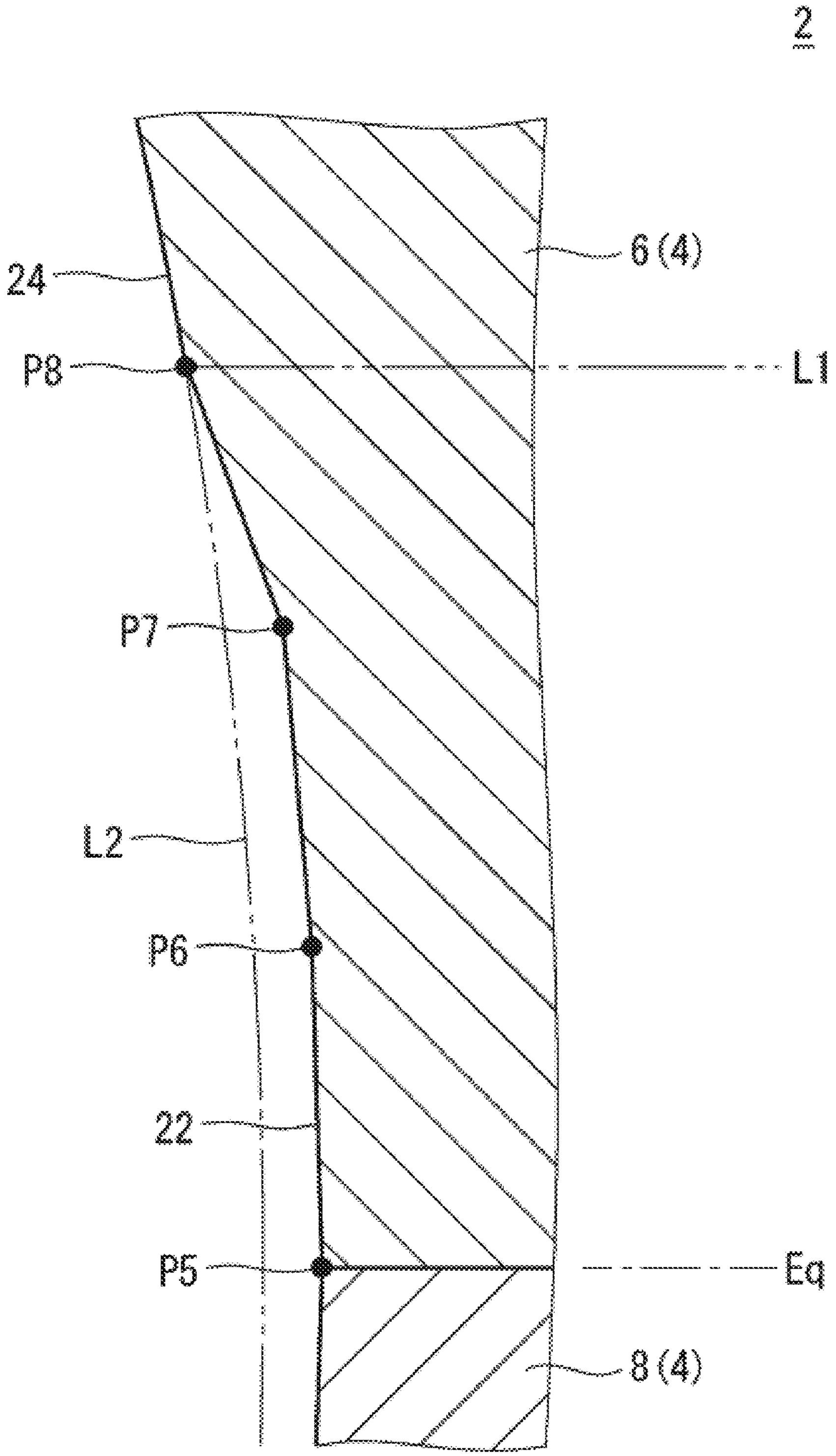
FIG. 20 is a cross-sectional view showing a part of the mold in FIG. 4 in a further enlarged manner.

FIG. 20 shows a part of the mold 2 in FIG. 4 in a further enlarged manner. In FIG. 20, four points indicated by reference characters P5 to P8 are on the low-latitude base surface 22. The point P5 is on the equator plane Eq. The point P8 is on the boundary line L1. In a cross-sectional shape of the low-latitude base surface 22, the portion from the point P5 to the point P6 can be regarded as a straight line, the portion from the point P6 to the point P7 can be regarded as a straight line, and the portion from the point P7 to the point P8 can also be regarded as a straight line. In other words, this cross-sectional shape can include a plurality of straight lines. The golf ball intermediate product 36 obtained with the mold 2 having this low-latitude base surface 22 can be easily cut.

In the present embodiment, the point P5, the point P6, and the point P7 can be on one arc. The center of the arc can coincide with the center of the phantom sphere L2. The distance from the phantom sphere L2 to the low-latitude base surface 22 can vary with latitude. In the present embodiment, this distance can be maximum at the point P5, the point P6, and the point P7. The golf ball intermediate product 36 obtained with the mold 2 having this low-latitude base surface 22 can be easily cut.

On the low-latitude base surface 22, since the portion from the point P7 to the point P8 can be regarded as a straight line, the difference between the direction of the low-latitude base surface 22 and the direction of the high-latitude base surface 24 at the point P8 can be relatively small. In the golf ball intermediate product 36 obtained with the mold 2, the large-diameter zone 38 (see FIG. 14) may be less likely to be left uncut.

The cross-section from the point P5 to the point P8 may be a combination of multiple curves. The cross-section from the point P5 to the point P8 may be a combination of a straight line and a curve. The cross-section from the point P5 to the point P8 preferably can have a corner sandwiched between two lines. This corner can be used as a guide in fine-tuning a cutting device for a proper depth of cutting of the burr 46 and the large-diameter zone 38.

EXAMPLES

Hereinafter, one or more advantageous effects of molds for golf balls according to Examples will be shown, but the scope disclosed in the present specification should not be construed in a limited manner on the basis of the description of these Examples.

Example 1

The mold shown in FIGS. 1 to 12 was prepared. In this mold, the ratio Pe of the length of the contour in the low-latitude zone to the total length of the contour was 75%. The latitude of each boundary line L1 was 6°. The maximum value Hm of the height of the side surface of each intersecting pimple was 75 μm. The position of the maximum value Hm was on the equator plane (latitude was 0°). A core having a center whose material was a rubber composition and a mid layer whose material was an ionomer resin composition was prepared. The core was covered with two half shells whose material was a polyurethane composition. The core and the half shells were placed into the mold, and the half shells were pressurized and heated to obtain a golf ball intermediate product. The intermediate product had a large-diameter zone and a burr. The large-diameter zone and the burr were removed by cutting with sandpaper. A clear paint including a two-component curing type polyurethane as a base material was applied to the intermediate product to obtain a golf ball having a diameter of about 42.7 mm and a mass of about 45.4 g.

Examples 2 to 5

Golf balls were obtained in the same manner as Example 1, except that molds in which the maximum value Hm was different were used.

Examples 6 to 8

Golf balls were obtained in the same manner as Example 1, except that molds in which the ratio Pe and the latitude of the boundary line L1 were different were used.

Example 9

A golf ball was obtained in the same manner as Example 1, except that a mold in which the latitude of the position of the maximum value Hm was 3° was used.

Example 10

A golf ball was obtained in the same manner as Example 1, except that a mold in which the latitude of the boundary line L1 was 15° was used.

Comparative Example 1

A golf ball was obtained in the same manner as Example 1, except that a mold in which no equatorial zone existed was used.

Comparative Example 2

A golf ball was obtained in the same manner as Example 1, except that a mold in which no equatorial zone existed and the parting face was flat was used.

[Workability]

Workability was evaluated on a scale of A to D based on the time required to optimize the conditions of a cutting machine in a burr removing step. The results are shown in Tables 1 to 3 below.

[Flight Symmetry]

Lift force coefficients and drag coefficients during PH rotation and during POP rotation were measured, and flight symmetry was evaluated on a scale of A to D. The results are shown in Tables 1 to 3 below.

[Appearance]

The golf balls were visually observed and evaluated on a scale of A to D for appearance. The results are shown in Tables 1 to 3 below.

TABLE 1

| Evaluation results | | | | | |
|---|---|---|---|---|---|
| | Example 2 | Example 3 | Example 4 | Example 1 | Example 5 |
| Ratio Pe (%) | 75 | 75 | 75 | 75 | 75 |
| Latitude of boundary line L1 (deg.) | 6 | 6 | 6 | 6 | 6 |
| Maximum thickness Hm (μm) | 10 | 30 | 50 | 75 | 150 |
| Latitude of maximum thickness Hm (deg.) | 0 | 0 | 0 | 0 | 0 |
| Workability | C | B | A | A | C |
| Flight symmetry | B | A | B | A | A |
| Appearance | C | B | B | A | A |
| Overall evaluation | 4 | 7 | 7 | 9 | 7 |

TABLE 2

| Evaluation results | | | |
|---|---|---|---|
| | Example 6 | Example 7 | Example 8 |
| Ratio Pe (%) | 25 | 50 | 100 |
| Latitude of boundary line L1 (deg.) | 3 | 5 | 10 |
| Maximum thickness Hm (μm) | 75 | 75 | 75 |
| Latitude of maximum thickness Hm (deg.) | 0 | 0 | 0 |
| Workability | B | B | B |
| Flight symmetry | C | C | A |
| Appearance | B | A | C |
| Overall evaluation | 5 | 6 | 6 |

TABLE 3

| Evaluation results | | | | |
|---|---|---|---|---|
| | Example 9 | Example 10 | Comparative Example 1 | Comparative Example 2 |
| Ratio Pe (%) | 75 | 100 | — | — |
| Latitude of boundary line L1 (deg.) | 6 | 15 | — | — |
| Maximum thickness Hm (μm) | 75 | 75 | — | — |
| Latitude of maximum thickness Hm (deg.) | 3 | 0 | — | — |
| Workability | B | C | C | D |
| Flight symmetry | B | C | C | D |
| Appearance | B | B | C | D |
| Overall evaluation | 6 | 4 | 3 | 0 |

As shown in Tables 1 to 3, a golf ball that is excellent in various performance characteristics can be obtained with the mold of each Example. From the evaluation results, advantages of this mold are clear.

[Disclosure Items]

Each of the following items is a disclosure of a preferred embodiment.

[Item 1]

A mold for golf balls, the mold including a pair of mold halves configured to be mated with each other thereby forming a cavity having a spherical shape, wherein each of the mold halves has a cavity face including a plurality of pimples, the cavity face has a low-latitude zone and a high-latitude zone, the low-latitude zone includes a low-latitude base surface having an inner diameter larger than an inner diameter of a phantom sphere of the cavity, the high-latitude zone includes a high-latitude base surface having an inner diameter equal to the inner diameter of the phantom sphere, each of the pimples protrudes from the low-latitude base surface or the high-latitude base surface, and a pimple, of the plurality of pimples, that intersects an equator plane of the phantom sphere or is proximal to the equator plane protrudes partially or entirely from the low-latitude base surface.

[Item 2]

The mold according to Item 1, wherein a contour of the pimple that intersects the equator plane or is proximal to the equator plane belongs to the low-latitude zone over a length that is not less than 25% of a total length of the contour.

[Item 3]

The mold according to Item 1 or 2, wherein a latitude of a boundary between the low-latitude zone and the high-latitude zone is not greater than 10°.

[Item 4]

The mold according to any one of Items 1 to 3, wherein the pimple that intersects the equator plane or is proximal to the equator plane has a convex surface and a side surface, the convex surface is separated from the low-latitude base surface, and the side surface extends in a height direction of the convex surface and extends from an edge of the convex surface to the low-latitude base surface.

[Item 5]

The mold according to Item 4, wherein a maximum value of a height of the side surface is not less than 20 μm.

[Item 6]

The mold according to Item 4 or 5, wherein the side surface has a maximum height at the equator plane.

[Item 7]

The mold according to any one of Items 4 to 6, wherein a cross-sectional shape of the low-latitude base surface includes a plurality of straight lines.

[Item 8]

A golf ball production method comprising:

placing a material into a mold including a pair of mold halves configured to be mated with each other thereby forming a cavity having a substantially spherical shape, wherein each of the mold halves has a cavity face including a plurality of pimples, the cavity face has a low-latitude zone and a high-latitude zone, the low-latitude zone includes a low-latitude base surface having an inner diameter larger than an inner diameter of a phantom sphere of the cavity, the high-latitude zone includes a high-latitude base surface having an inner diameter equal to the inner diameter of the phantom sphere, each of the pimples protrudes from the low-latitude base surface or the high-latitude base surface, and a pimple that intersects an equator plane of the phantom sphere or is proximal to the equator plane protrudes partially or entirely from the low-latitude base surface;

pressurizing the material in the mold to obtain a golf ball intermediate product having a shape that is an inverted shape of the cavity face; and cutting a vicinity of an equator of the golf ball intermediate product.

[Item 9]

The golf ball production method according to Item 8, further comprising producing the golf ball after said cutting the vicinity of the equator of the golf ball intermediate product.

[Item 10]

The golf ball production method according to Item 8 or Item 9, wherein a contour of the pimple that intersects the equator plane or is proximal to the equator plane belongs to the low-latitude zone over a length that is not less than 25% of a total length of the contour.

[Item 11]

The golf ball production method according to any one of Item 8 to Item 10, wherein a latitude of a boundary between the low-latitude zone and the high-latitude zone is not greater than 10°.

[Item 12]

The golf ball production method according to any one of Item 8 to Item 11, wherein the pimple that intersects the equator plane or is proximal to the equator plane has a convex surface and a side surface, the convex surface is separated from the low-latitude base surface, and the side surface extends in a height direction of the convex surface and extends from an edge of the convex surface to the low-latitude base surface.

[Item 13]

The golf ball production method according to Item 12, wherein a maximum value of a height of the side surface is not less than 20 μm.

[Item 14]

The golf ball production method according to Item 12 or Item 13, wherein the side surface has a maximum height at the equator plane.

[Item 15]

The golf ball production method according to any one of Item 8 to Item 14, wherein a cross-sectional shape of the low-latitude base surface includes a plurality of straight lines.

Golf balls having various structures can be obtained with the aforementioned mold. Golf balls of various materials can be obtained with the mold.

What is claimed is:

1. A golf ball production method comprising:

placing a material into a mold including a pair of mold halves configured to be mated with each other thereby forming a cavity having a spherical shape, wherein each of the mold halves has a cavity face including a plurality of pimples, each of the cavity faces has a low-latitude zone and a high-latitude zone, each of the low-latitude zones includes a low-latitude base surface having an inner diameter larger than an inner diameter of a phantom sphere of the cavity, each of the high-latitude zones includes a high-latitude base surface having an inner diameter equal to the inner diameter of the phantom sphere, each of the pimples protrudes from the low-latitude base surfaces or the high-latitude base surfaces, the pimples including a pimple that intersects an equator plane of the phantom sphere and that protrudes partially or entirely from the low-latitude base surfaces and a pimple that is proximal to the equator plane and that protrudes partially or entirely from the low-latitude base surfaces, the pimple that intersects the equator plane of the phantom sphere including a portion that crosses the equator plane of the phantom sphere;

pressurizing the material in the mold to obtain a golf ball intermediate product having a shape that is an inverted shape of the cavity faces; and cutting a vicinity of an equator of the golf ball intermediate product, wherein:

the equator plane is a plane where the pair of mold halves meet at a latitude of 0°, the pimple that intersects the equator plane or is proximal to the equator plane has a rounded convex surface that extends radially inwardly and a side surface, the rounded convex surface is separated from the low-latitude base surfaces, and the side surface extends in a height direction of the rounded convex surface, the height direction of the rounded convex surface being a radial direction from a center of the phantom sphere, and the side surface extends directly from an outer edge of the rounded convex surface to the low-latitude base surfaces in the height direction of the rounded convex surface, and a cross-sectional shape of the low-latitude base surfaces, taken along a plane perpendicular to the equator plane and passing through the center of the phantom sphere, consists of three or more straight lines.

2. The golf ball production method according to claim 1, further comprising:

producing the golf ball after said cutting the vicinity of the equator of the golf ball intermediate product.

3. The golf ball production method according to claim 1, wherein a contour of the pimple that intersects the equator plane or is proximal to the equator plane belongs to the low-latitude zones over a length that is not less than 25% of a total length of the contour.

4. The golf ball production method according to claim 1, wherein latitudes of boundaries between the low-latitude zones and the high-latitude zones are not greater than 10°.

5. The golf ball production method according to claim 1, wherein a maximum value of a height of the side surface is not less than 20 μm.

6. The golf ball production method according to claim 1, wherein the side surface has a maximum height at the equator plane.

7. The golf ball production method according to claim 1, wherein latitudes of boundaries between the low-latitude zones and the high-latitude zones are not greater than 8°.

* * * * *